Nov. 11, 1969

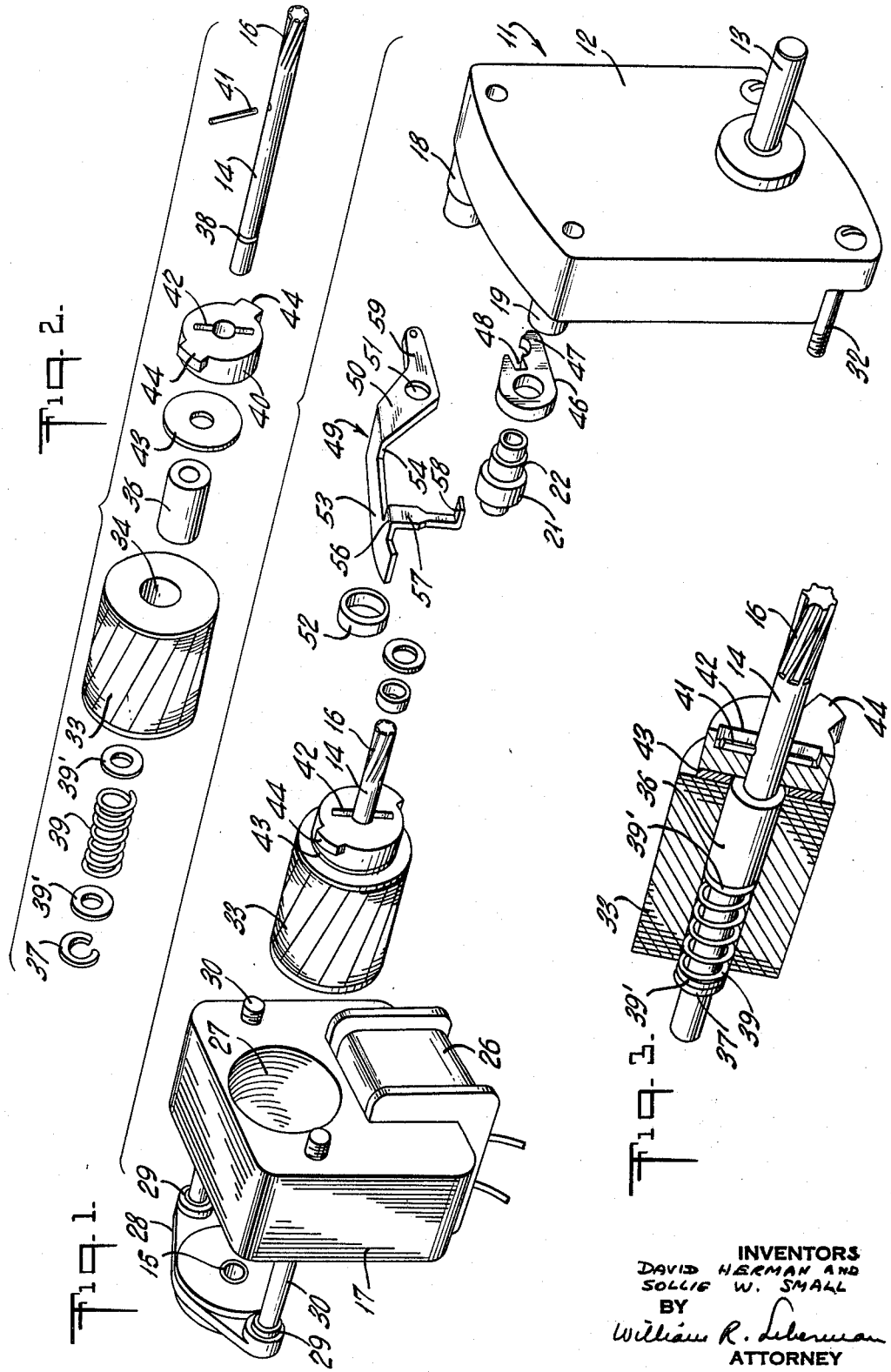

D. HERMAN ETAL 3,478,238

INDEXED MOTOR CONTROL DEVICE

Filed Nov. 17, 1967

INVENTORS
DAVID HERMAN
DOLLIE W. SMALL
BY
William R. Liberman
ATTORNEY

United States Patent Office
3,478,238
Patented Nov. 11, 1969

3,478,238
INDEXED MOTOR CONTROL DEVICE
David Herman, Livingston, and Sollie W. Small, Short Hills, N.J., assignors to Coffee-Mat Corporation, Kenilworth, N.J., a corporation of New Jersey
Filed Nov. 17, 1967, Ser. No. 683,886
Int. Cl. H02k 7/102, 7/106
U.S. Cl. 310—77                                      6 Claims

ABSTRACT OF THE DISCLOSURE

An electric motor includes a rotor rotatably mounted on a drive shaft and coupled thereto by a slip clutch actuated by a spring housed in an enlarged coaxial bore in the rotor. A member including radial indexing shoulders is affixed to the drive shaft and a stop lever pivoted to the motor is spring-urged into the path of the shoulders and is retractable by a rockable armature lever magnetically actuated by the energized motor stator. Upon deenergization of the motor, the armature is released to permit the spring advance of the stop lever to stop the drive shaft while the rotor continues rotation and upon energization of the motor the movement of the armature effects the striking and retraction of the stop lever to release the drive shaft.

BACKGROUND OF THE INVENTION

The present invention relates generally to improvements in electric motor control devices and it relates particularly to an improved electric motor drive device which effects the stopping of an electric motor drive at a precise indexed position.

There are many devices which require the accurate movement and adjustment thereof to predetermined positions and commonly employ electric motor drives to effect such movement or adjustment. Since the electric motor is generally of a relatively high speed, large, awkward and expensive braking devices are required to overcome the momentum of the rotating rotor attendant to the stopping of motor drive or accurate positioning is not achieved. Motor positioning systems heretofore employed or proposed possess many drawbacks and disadvantages, they usually represent a compromise between bulk and cost on the one hand and accuracy on the other hand, and otherwise leave much to be desired.

SUMMARY OF THE INVENTION

It is a principal object of the present invention to provide an improved electric motor drive control device.

Another object of the present invention is to provide an improved electric motor control device for stopping the motor drive precisely at a predetermined position.

Still another object of the present invention is to provide an improved highly compact, automatically activated indexed motor drive-stopping device.

A further object of the present invention is to provide a device of the above nature characterized by its reliability, simplicity, ruggedness, accuracy, adaptability and low cost.

The above and other objects of the present invention will become apparent from a reading of the following description taken in conjunction with the accompanying drawings which illustrate preferred embodiments thereof.

In a sense, the present invention contemplates the provision of an indexed motor driven control device comprising an electric motor including a rotor and a stator, a drive shaft, means responsive to the deenergization of said motor for positively stopping said drive shaft at least one predetermined indexed position, and means including a slip coupling connecting said rotor to said drive shaft. Advantageously, the rotor has an enlarged axial bore formed in the rear section thereof and a helical compression spring encircling the drive shaft is housed in the bore and entrapped between the forward shoulder of the enlarged bore and an abutment mounted on the shaft rearwardly of the shoulder to urge the rotor forwardly. Alternatively, instead of housing the spring on the enlarged rotor bore, the rotor may be forwardly urged by a helical, spiral or undulated annular spring entrapped between the shaft mounted abutment by way of sandwiched washers and the confronting face of the rotor. Affixed to the shaft forward of the rotor is a clutch member provided with radially projecting indexing elements. A friction disc is positioned between the rotor and the clutch member and may be engaged by the clutch member so as to rotate therewith independently of any frictional engagement. A stop lever is mounted on the motor and has a stop element located at its end and movable into and out of the path of the indexing elements. A magnetic armature lever is pivoted to the motor and is spring-urged into engagement with the stop lever to urge the stop element into registry with the path of the indexing elements and, upon energization of the motor, strikes and acts on the top lever to retract it from the path of the indexing elements.

BRIEF DESCRIPTION OF THE DRAWINGS

FIGURE 1 is an exploded perspective view of a device embodying the present invention;

FIGURE 2 is an exploded perspective view of the rotor and drive shaft assembly thereof;

FIGURE 3 is a perspective longitudinal sectional view of said assembly;

DESCRIPTION OF THE PREFERRED EMBODIMENTS

Figure 4:
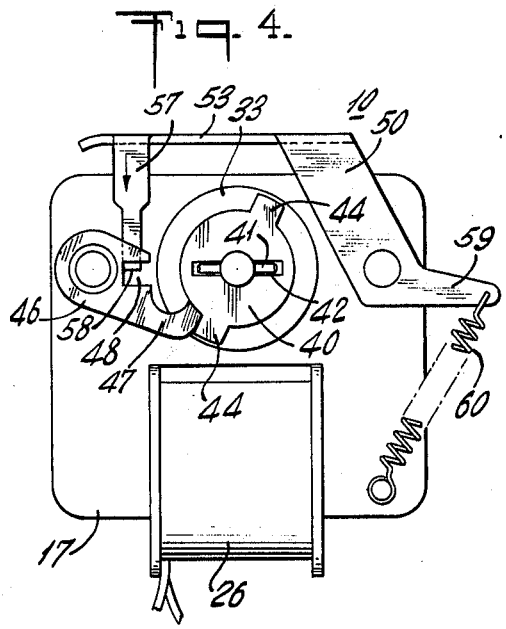
FIGURE 4 is a front elevational view of the device shown in a stopped position, with the front thereof broken away.

Referring now to the drawings and particularly FIGURES 1 to 5 thereof which illustrate a preferred embodiment of the present invention, reference numeral 10 generally designates the improved motor driven control device which comprises a gear reduction unit 11 of known construction. Unit 11 includes a mounting frame-defining casing 12 which houses the gear reduction assembly, the gear reduction unit including a low speed output shaft 13 projecting forwardly from the lower part thereof and a high speed input drive shaft 14 projecting rearwardly from the upper part thereof and including a helically splined leading end 16 which has affixed thereto the input gear of the speed reducing unit 11.

A laminated motor stator 17 is positioned shortly rearwardly of the rear face of casing 12 and is separated therefrom by a first tubular spacer 18 projecting from one upper corner of casing 12 and provided with a trailing section of reduced outside diameter, and by a second tubular spacer assembly comprising a sleeve 19 projecting rearwardly from the other upper corner of the rear face of casing 12, and a tubular stepped member 21 including a reduced diameter forward section telescoping the sleeve 19, an intermediate bearing section 22 followed by an enlarged spacer section, and a rear reduced diameter insert section entering a mating coupling bore in the upper corner of the stator 17. The spacer 18 is provided with a rear section of reduced diameter which enters a corresponding coupling bore formed in the upper part of stator 17.

Stator 17 is provided with a conventional winding 26 and rotor accommodating bore 27 coaxial with shaft 14. An outboard bearing assembly 28 is positioned on the rear face of stator 17 and is provided with a bore 15 which engages the rear section of shaft 14 and a pair of laterally spaced tubular coupling elements 29 which register with the stator upper coupling bores. A pair of screws 30 register with coupling elements 29, the stator coupling bores, spacers 18, 19 and 21 and engage correspondingly tapped members or nuts carried by the casing 12 to lock stator 17, casing 12 and bearing 28 in assembled condition. A pair of screws 32 registering with bores at the lower corners of the casing 12 further secures stator 17 to casing 12.

A motor rotor 33 of known construction is coaxially positioned within stator bore 27, and is provided with an axial bore 34. A sleeve bushing or bearing 36 is nested in the forward section of stator bore 34 and is affixed therein by a force fit or the like, bearing sleeve 36 engaging shaft 14 to permit the independent rotation of rotor 33 on the shaft. An abutment-defining split ring 37 engages a peripheral groove 38 formed in the trailing section of shaft 14 forward of bearing member 28. Nested in stator bore 34 rearwardly of the bearing sleeve 36 is a helical compression spring 39 which encircles shaft 14 and is sandwiched between a pair of end washers 39' positioned along the confronting faces of the split ring 37 and the sleeve bearing 36 whereby to be entrapped between the split ring 37 and the rear face of the sleeve bearing 36 to spring bias and urge the rotor 33 forwardly along the shaft 14.

A circular clutch member 40 having a flat rear face is mounted on shaft 14 forward of rotor 33 and is restricted against rotation on and axial forward movement along shaft 14 by a key pin 41 projecting through a transverse bore formed in shaft 14 and engaging a diametric groove 42 formed in the front face of clutch 40. A friction annulus 43 is mounted on shaft 14 between rotor 33 and clutch member 40 and provides a frictional slip coupling between the flat confronting faces of rotor 33 and clutch 40 under the influence of spring 39.

Integrally formed with and projecting radially outwardly from clutch 40 are a pair of opposite indexing shoulder which may be colinear with or at an angle to the radii of clutch 40. It should be noted that while two indexing elements 44 are shown only one or no more than two may be provided.

A stop member defined by an arm 46 is rockably supported at one end thereof by the post bearing section 22 and is restricted against axial movement thereon and lies in the plane of the index element 44. Arm 46 projects from its pivot point to a point below the shaft 14 and terminates in a hook shaped stop element defining finger 47 provided with an outer extension which is movable with the rocking of arm 46 into and out of the circular path of index elements 44. The outer face of the stop element 47 functions to stop the forward rotation of the clutch member 40 and the inner face of the stop element 47 functions to stop the reverse rotation of the clutch member 40, should such rotation occur. A recess 48 having top and bottom shoulders is formed in the upper part of arm 46 laterally inwardly offset from the pivot axis thereof.

A magnetically actuated rockable lever or armature 49 includes an inclined intermediate section 50 having a circular opening 51 formed therein engaging the reduced portion of spacer post 18 and restricted against axial movement by a spacer collar 52 engaging the spacer post and entrapped between stator 17 and lever section 50. A rearwardly offset inwardly projecting arm 53 is joined to the upper part of the lever section 50 by a bridge element 54, arm 53 overlying the upper face of stator 17 and, like the remainder of lever 49, being formed of a magnetic material. Projecting forwardly from the free forward edge of arm 53 is an arm 56 which joins a depending section 57 positioned between stator 17 and lever 46. Section 57 terminates in a forwardly projecting lug 58 which engages slot 48 and defines therewith a lost motion coupling between levers 46 and 49. An arm 59 extends laterally from the lower end of lever section 50 in a direction opposite to arm 53 and is conected at its free end by a depending helical tension spring 60 to a fixed point whereby resiliently to urge lever 59 clockwise, as viewed in FIGURES 4 and 5.

Figure 5:
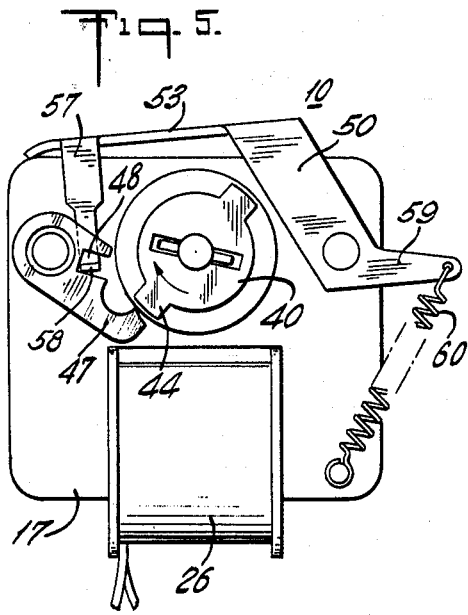
FIGURE 5 is a front elevational view thereof shown in a running condition, and with the front broken away.

Considering now the operation of the motor control device described above under normal motor running conditions, as seen in FIGURE 5, stator 17 is energized and magnetically attracts and holds armature arm 53 in a depressed position. Lug 58 bears on the bottom shoulder of recess 48 to depress stop lever 46 and retract the stop finger element 47 from the path of index elements 44 whereby to permit the free rotation of the clutch member 40 and drive shaft 14. To stop the rotation of drive shaft 14 sharply, motor stator 17 is merely deenergized whereby to magnetically release the armature arm 53 so that the lever 49, in the nature of a bell crank is rocked clockwise about post 18 by tension spring 60. Lug 58 is thus raised until it engages the upper shoulder of recess 48 and rocks lever 46 counterclockwise to raise the stop element 47 into the path of an index element 44. When index element 47 strikes a stop element 44, clutch 40 and drive shaft 14 are promptly stopped at a correspondingly predetermined position as seen in FIGURE 4. Rotor 33, however, by reason of its high momentum and its slip coupling to stationary clutch member 40 continues to rotate until its energy is frictionally dissipated. The maximum stress and shock imparted to cltuch 40, drive shaft 14 and stop lever 46 and the associated mechanism is determined by the momentum of rotor 33 and the torque limit of the friction coupling and is substantially insignificant.

Upon starting the motor, stator winding 26 is electrically energized to magnetize stator 17 and rapidly depress armature arm 53 from a stationary position at an accelerated speed. Lug 58 travels downwardly in recess 48 gathering momentum with the rocking lever 49 until it strikes the bottom shoulder of recess 48 forcibly to jar stop element 47 downwardly, and the further downward movement of lug 58 by armature 53 under the increased magnetic attraction thereof rocks arm 46 downwardly to retract stop element 47 from the path of the index elements 44. Clutch member 40 and shaft 14 are thus released and are rotated by the rotor 33 through the slip coupling arrangement.

Figure 6:
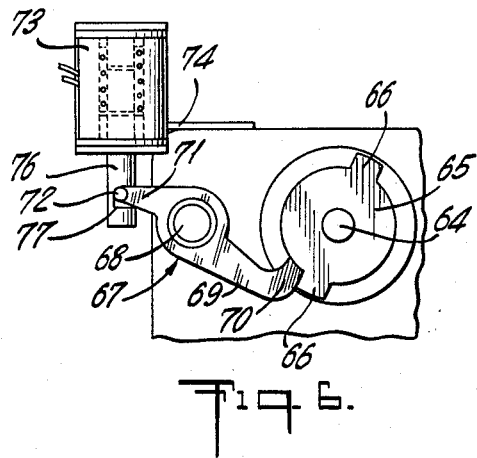
FIGURE 6 is a fragmentary front elevational view of another embodiment of the present invention shown in a stopped position.
Figure 7:
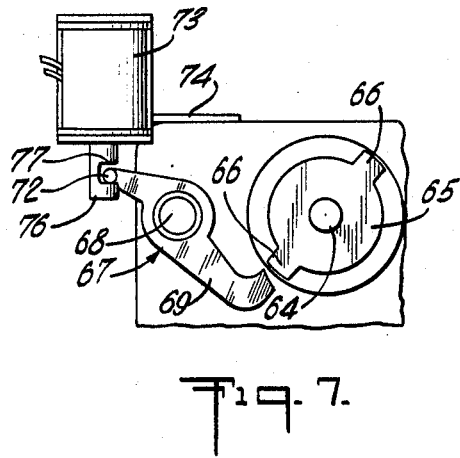
FIGURE 7 is a fragmentary front elevational view thereof shown in a running condition.

Referring now to FIGURES 6 and 7 of the drawings, which illustrate another embodiment of the present invention which differs from that first described primarily in the mechanism for actuating the stop lever, the device in all other respects being similar to that first described, reference numeral 64 designates a driven shaft which corresponds to drive shaft 14 and has associated therewith a spring biased rotor, motor stator and gear reduction unit as earlier set forth. Affixed to shaft 64 and similar in construction to clutch 40 is a clutch member 65 associated with the rotor through a friction annulus. A pair of opposite outwardly directed index members 66 are integrally formed with clutch 65.

A rocker lever 67 is swingably mounted on a pivot 68 and includes a first arm 69 terminating in hook shaped outer section 70 which defines a stop element movable with lever 67 into and out of the path of the index elements 66, the outer face of the stop element 70 functioning to stop the forward rotation of the clutch member 65 and the rear face thereof functioning to stop the reverse rotation of the clutch member 65. Lever 67 includes an oppositely directed second arm 71 terminating in an integral transverse coupling pin 72.

An actuating solenoid 73 is suitably supported by a bracket 74 and has associated therewith and motivates a plunger armature 76 which is spring urged to its lower extended position and is withdrawn into the solenoid 73 upon energization of the solenoid. Solenoid 73 is electrically connected in parallel with the motor stator winding so as to be simultaneously energized and deenergized therewith. A recess 77 of greater height than the diameter of pin 72 is formed in the lower side face of the plunger 76 and is engaged by pin 72 to provide a lost motion coupling between the pin 72 and plunger 76.

The operation of the device last described is similar to that of the first described embodiment. The energization of the motor stator is accompanied by the simultaneous energization of solenoid 73, the later effecting the retraction of the plunger 76 which in turn strikes pin 72 with the lower shoulder of the coupling recess and rocks arm 69 downwardly to depress stop element 70 and release clutch member 66 for the free turning thereof and the shaft 64 by the slip coupled rotor. Upon deenergization of the motor, solenoid 73 is deenergized and plunger 76 is spring advanced to rock the arm 69 upwardly and bring the stop element 70 in the path of the index elements 66 whereby to stop shaft 64 in a predetermined position.

Figure 8:
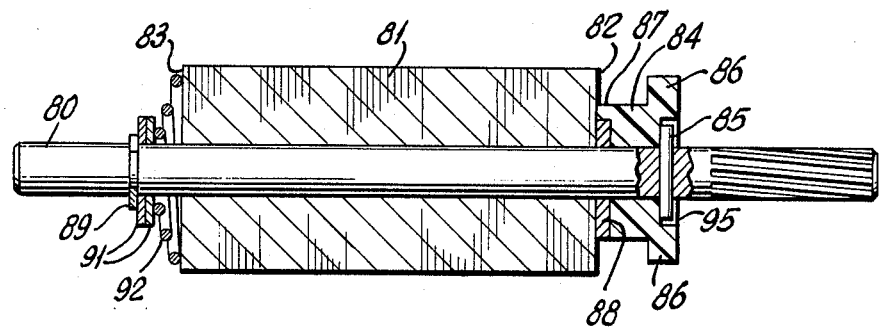
FIGURE 8 is a medial longitudinal sectional view of a rotor, clutch and shaft assembly of another embodiment of the present invention.
Figure 9:
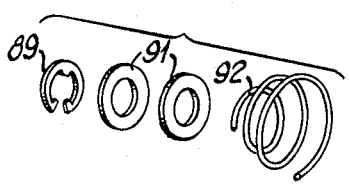
FIGURE 9 is an exploded perspective view of the spring biasing arrangement thereof.

In FIGURES 8 and 9 of the drawings there is illustrated another embodiment of the present invention differing from those first described in the spring biasing arrangement of the rotor and the clutch assembly and being similar thereto in all other respects. Specifically, the alternative assembly includes a shaft 80 corresponding to the shafts 14 and 64 of the earlier described embodiments on which is freely rotatably mounted a rotor 81 having front and rear end faces 82 and 83 respectively. A clutch member 84 is affixed to the shaft 80 forward of the rotor face 82 and is prevented from rotation on the shaft by a diametric pin 85 passing through the shaft 80 and engaging a diametric recess 95 in the front face of the clutch member 84. One or more radially outwardly directed index members 86 are integrally formed with the clutch member 84.

A segment shaped projection 87 is formed on the peripheral border of the rear face of the clutch member 84. A friction disc 88 is sandwiched between the rear face of the clutch member 84 and the rotor front face 82 and complements the segment projection 87, being provided with a flatted edge section engaging the cord section of the projection 87. The disc 88 is of greater thickness than that of the projection 87 and the mating of the flattened disc 88 and the projection 87 assures concurrent rotation of the disc 88 and clutch member 84.

A split ring 89 engages a peripheral groove 90 formed in the shaft 80 rearwardly of the rotor rear face 83. A pair of freely rotatable abutting low friction annuli or washers 91 engage the shaft 80 immediately forward of the split ring 89 and a spiral helical compression spring 92 is entrapped between the rotor rear face 83 and the confronting washer 91 to normally urge the rotor 81 forwardly and the friction coupling of the clutch member 84 and the rotor 81 through the friction disc 88. The rear convolution of the spring 92 is of lesser diameter than and bears on the annulus 91 and the forward convolution of the spring 92 is of a diameter between those of the rotor 81 and the washers 91. The outside diameter of each convolution of the spring 92 is less than the inside diameter of the next preceding convolution so that the spring 82 when in a compressed condition may be relatively flat.

Figure 10:
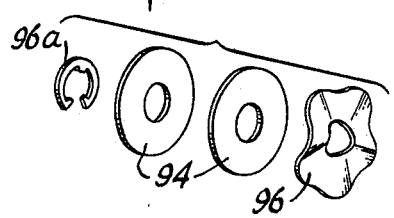
FIGURE 10 is a view similar to FIGURE 9 of another embodiment of the present invention.

The modified structure illustrated in FIGURE 10 differs from that last described only in the substitution of an undulated annular spring for the spiral helical spring and the use of correspondingly larger washers. A pair of abutting relatively large low friction washers 94 engage the rotor carrying shaft rearwardly of the rotor and restricted against rearward movement by an abutment defining split ring 96a engaging an annular groove in the rotor shaft. The rotor is normally urged to a clutch engaged position by an undulated annular resilient metal spring 96 entrapped between the rotor rear face and the forward washer 94, the spring 96 being under compression.

Figure 11:
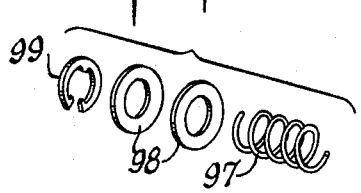
FIGURE 11 is a view similar to FIGURE 9 of still a further embodiment of the present invention.

The arrangement illustrated in FIGURE 11 differs from that shown in FIGURES 8 and 9 only in the substitution of a helical compression spring 97 of uniform diameter for the spiral helical spring 92. The spring 97 is entrapped between the rotor rear face and the washers 98 whose rearward movement is limited by the split ring 99.

The operation of the embodiments illustrated in FIGURES 8 to 11 is similar to that of the first described embodiments.

While there have been described and illustrated preferred embodiments of the present invention, it is apparent that numerous alterations, omissions and additions may be made without departing from the spirit thereof.

We claim:

1. An indexed motor-driven control device comprising an electric motor including a cylindrical rotor and a stator, a drive shaft rotatably supporting said rotor relative to said drive shaft, a first friction clutch member mounted on and rotatable with said shaft forwardly of said rotor, said rotor having an enlarged axial bore formed therein in the section rearwardly remote from said first clutch member and being provided with an abutment spaced inwardly of said enlarged bore outer end, a second abutment mounted on said drive shaft rearwardly remote from said first abutment, a compressed helical spring surrounding said shaft and nesting in said enlarged axial bore and entrapped between said first and second abutments and urging said rotor into a frictional slipping coupling with said first coupling member, and means responsive to the deenergization of said motor for positively stopping said drive shaft.

2. The control device of claim 1, wherein said indexed stopping means compirses an indexing member mounted on and rotatable with said drive shaft and including at least one radially extending indexing shoulder, and a stop element movable into and out of the path of said indexing shoulder.

3. The control device of claim 2, wherein said indexed stopping means includes means normally urging said stop element into the path of said indexing shoulder and means responsive to the energization of said motor for retracting said stop element from the path of said indexing shoulder.

4. The control device of claim 2, wherein said stop element comprises a first lever rockably mounted on said motor and including a section movable therewith between advanced and retracted positions, respectively in and out of the path of said indexing shoulder, and said stop means includes a second lever rockably mounted on said motor and engageable with said first lever and movable therewith between advanced and retracted positions, spring means normally urging said first and second levers to advanced positions, said second lever including an armature section formed of magnetic material responsive to the energization of said motor stator to retract said first and second levers.

5. The control device of claim 1 including a frictional disc registering with said shaft between said rotor and said clutch member, said stopping means including at least one radially extending shoulder located on said clutch member, a first lever rockably mounted on said motor and including a section movable therewith between advanced and retracted positions, respectively in and out of the path of said indexing shoulder, a second lever rockably mounted on said motor and lost motion coupled to said first lever, spring means normally urging said first and second levers to advanced positions, said second lever including an armature section formed of magnetic material responding to the energization of said motor stator to retract said first and second levers.

6. The control device of claim 5, wherein said second lever includes a coupling section movable into and out of engagement with said first lever at a point offset from the rocking axis of said first lever and successively urged out of engagement therewith and urged into engagement with said first lever upon energization of said motor.

References Cited

UNITED STATES PATENTS

| 2,539,836 | 1/1951 | Hoffmann | 310—77 |
| 2,575,442 | 11/1951 | Cooley | 310—76 X |
| 2,351,997 | 6/1944 | Morrill | 192—2 |
| 3,219,858 | 11/1965 | Ellis et al. | 310—77 |
| 3,344,292 | 9/1967 | Hurst | 310—76 |
| 3,392,811 | 7/1968 | Heisler | 310—12 |

BENJAMIN W. WYCHE III, Primary Examiner

U.S. Cl. X.R.

192—172, 2, 24; 64—30